REMOTELY CONTROLLED RECORD CHANGER

Filed Feb. 6, 1961 3 Sheets-Sheet 1

INVENTORS
Robert Van Antwerp and Gerald H. Freier
By Brown, Jackson, Boettcher & Dienner
Att'ys.

REMOTELY CONTROLLED RECORD CHANGER

Filed Feb. 6, 1961 3 Sheets-Sheet 2

INVENTORS
Robert Van Antwerp
and Gerald H. Freier
By Brown Jackson Boettcher & Dienner
Attys.

INVENTORS
Robert Van Antwerp
and Gerald H. Freier
By Brown Jackson Boettcher & Dienner
Attys.

United States Patent Office 3,228,698

Patented Jan. 11, 1966

3,228,698

REMOTELY CONTROLLED RECORD CHANGER

Robert Van Antwerp and Gerald H. Freier, Benton Harbor, Mich., assignors to V-M Corporation, Benton Harbor, Mich., a corporation of Michigan Filed Feb. 6, 1961, Ser. No. 87,457
11 Claims. (Cl. 274—10)

This invention is directed to automatic record changer apparatus, and more particularly to means for selectively effecting control of a plurality of functions of such apparatus from a location remote from the record changer itself.

Most conventional automatic record changers are readied for operation by placing a stack of records over the spindle and adjusting a record support arm, manually rotating the speed control knob to select the desired turntable speed, and then actuating the on-off-reject control knob from the "off" through the "on" to the "reject" position. In many conventional units the rotation of the on-off-reject control knob to the "on" position is effective to energize the turntable drive motor which thereupon commences rotation of the turntable, and the additional rotation of the control knob to the "reject" position effects a displacement of control means which initiates a cyclic operation of the record changer mechanism. The record changer mechanism may receive power from the turntable drive motor over the turntable itself, and translate the power thus received into movements such as the dropping of the bottom record from the unplayed record stack onto the rotating turntable, and displacement of the tone arm inwardly over the edge of the record and downwardly to land on the record and reproduce the intelligence therefrom. Thereafter such record changer automatically effects sequential play of each record in the stack.

If the listener rotates the on-off-reject control knob to the "reject" position during play of the stack of records the bottom record of the unplayed stack is dropped to the turntable stack for play or, if the record playing at the time of such movement of the control knob is the last (or only) record in the stack, automatic shut-off of the changer occurs. Because the on-off-reject control knob is positioned on the record changer itself, it has been necessary in the past for the listener to approach the record changer not only to energize the mechanism and initiate the successive playing of the records in the stack, but also to effect a manual operation of the control knob and "reject" any individual record as played.

To permit the automatic energization of a record changer and/or the rejection of a record from a location remote from the record changer itself, the present invention includes a novel mechanism for initiating a change cycle of the record changer mechanism, which mechanism can be actuated from a point remote from the record changer itself. To increase the versatility of the remote control record changer unit, it is further desirable to also provide automatic control of the shut-off function of the record chranger from a remote location. Conventional record changer mechanisms usually are prepared for automatic shut-off during the penultimate change cycle, when the last record is dropped from the unplayed stack to the turntable stack, and are shut off during the last change cycle of the mechanism. Thus, to provide positive shut-off of the record changer with one or more records remaining in the unplayed stack, it is further desirable that no record should be dropped to the turntable stack as the automatic shut-off function is accomplished.

It is therefore a primary object of the present invention to provide means for effecting selective control of a plurality of different functions of a record changing apparatus by transmitting command signals from a point remote from the record changer apparatus.

It is another important object of the invention to provide structure for effecting automatic shut-off of a record changer responsive to receipt of a command signal from a location remote from the record changer, such shut-off being accomplished while the stack of unplayed records is maintained in position on the spindle.

Still another object of the invention is the provision of a linkage mechanism movable in a jam-proof manner, whether operated by conventional manual selection means or by the novel remotely controlled arrangement of the invention, to turn the automatic record changer on, to effect rejection of any record as played, or to shut off the record changer apparatus at the desire of the listener.

Yet another object of the invention is the provision of selective control means operable from a location remote from the record changer to effect alternatively energization of the record changer mechanism, rejection of any record as played, and automatic shut-off of the record player without dropping any record from the unplayed stack.

Another important object of the invention is the provision of energy storage means for storing energy to effect the various above-enumerated objects as desired by the listener, and for tansferring energy to the energy storage means for storage therein at a time in the change cycle when there are substantially no other demands on the turntable drive arrangement, thus obviating the requirement of a larger or more powerful motor in the record changer unit.

In many conventional record changer units, a control knob or an on-off-reject selector is positioned above the baseplate for manual rotation by the listener to effect a related movement of an actuator means positioned below the baseplate. Such actuator means may comprise a reject rod and a control assembly operable to displace a trip link, and thus initiate a change cycle of the record changer mechanism in a manner well known and described, by way of example, in the Service Manual and Parts List for V–M Model 1201 Stereo Record Changer, published in 1958 by the V–M Corporation, Benton Harbor, Michigan.

As there taught, conventional mechanisms generally include an ejector bracket assembly which is engaged and displaced by an element of the record changer mechanism during each change cycle to effect a related movement of a push rod in the spindle mechanism and thus drop the lowest record in the unplayed stack to the turntable stack. Another conventional element of many record changer units is a record support shaft, which is connected to a record support arm that is displaceable to engage and steady the unplayed record stack. As the last record in the unplayed stack falls to the turntable stack, both the record support arm and record support shaft are vertically displaced. The record support shaft engages and displaces a stop arm coupled to other conventional elements to prepare or condition the record changer mechanism for shut-off during the next change cycle after the one in which the last record is dropped.

The present invention includes a novel remote control arrangement for shutting off the record changer by accomplishing three different control functions. Such a novel arrangement includes a first and a second auxiliary control means, the first auxiliary control means being at times operable independently of the second auxiliary control means, and at other times being operable with the second auxiliary control means. In its independent function the first auxiliary control means is operative, responsive to receipt of a command signal from a remotely located signalling means, to displace the actuator means including the reject rod, thereby energizing the unit and/ or initiating a cycle of the record changer mechanism, depending upon the condition of the equipment as the command signal is received. In its operation in combination with the second auxiliary control means the first auxiliary control means effects initiation of a change cycle (the first of the three control functions requisite to effect shut-off), and additionally stops the record changer without dropping the next record in the unplayed stack to the turntable. Such operation is basically accomplished by effecting displacement of the ejector bracket assembly by the second auxiliary control means from its first or operative position to a second or non-operative position in which it is not engaged or displaced during a cycle of the record changer mechanism (the second of the three required control functions), thus to prevent the dropping of a record from the unplayed stack onto the turntable stack. In addition the second auxiliary control means moves the stop arm (the last control function) to the position for conditioning the record changer mechanism for shut-off during the change cycle. Thus as the record changer mechanism advances through the change cycle which is initiated by the first auxiliary control means, the record changer unit is automatically shut off without dropping any record from the unplayed stack to the stack of records on the turntable.

The remote controlled mechanism basically comprises a first and a second auxiliary control means mounted on a common base. The first auxiliary control means includes a first actuator lever mounted for pivotal operation between two positions, the lever having a first arm for engaging a cocking lever, a flange portion for engaging a trip latch, and a flange member for operating the reject rod of the record changing mechanism. A trip latch holds the actuator lever in the first or cocked position as moved thereto by a cocking lever, and spring means connected between the base and the actuator lever move the lever to the second or restored position whenever the trip latch is operated to release the actuator lever. The flange member on the actuator lever operates the reject rod in its movement from the first to the second position. An electrically responsive device, such as an electromagnet, is provided to release the trip latch.

The second auxiliary control means comprises a second actuator lever, with a pair of control members connected thereto for movement responsive to movement of such actuator lever. The first control member can be a rod and spring element coupled to the ejector bracket assembly, so that movement of the second actuator lever tensions the spring and effects a corresponding displacement of the ejector bracket assembly to the second or non-operative position, thus to prevent the dropping of a record to the turntable stack during a change cycle. The second control element can be a rod and spring arrangement coupled between the second actuator lever and the stop arm, so that rotation of the actuator lever effects a related movement of the stop arm to condition the record changer mechanism for shut-off. A second trip latch is provided to maintain the second actuator lever in a first or cocked position, and bias means such as a spring is coupled between the second actuator lever and the common base to displace the actuator lever of the second auxiliary control means to a second or restored position when the second trip latch is released. A second electrically responsive device, such as an electromagnet, is provided to release the second trip latch and effect the second and third control functions described above responsive to energization of the second electromagnet from a remote control device. The novel secondary auxiliary control means can be returned from the restored to the cocked position by a cocking lever, which also effects the cocking or storage of energy in the first auxiliary control means.

The features of the present invention which are believed to be novel are set forth with particularity in the appended claims. The invention itself, together with further objects and advantages thereof, may best be understood by reference to the following description taken in connection with the accompanying drawings, in the several figures of which like reference numerals identify like elements, and in which:

GENERAL DESCRIPTION

Figure 1:
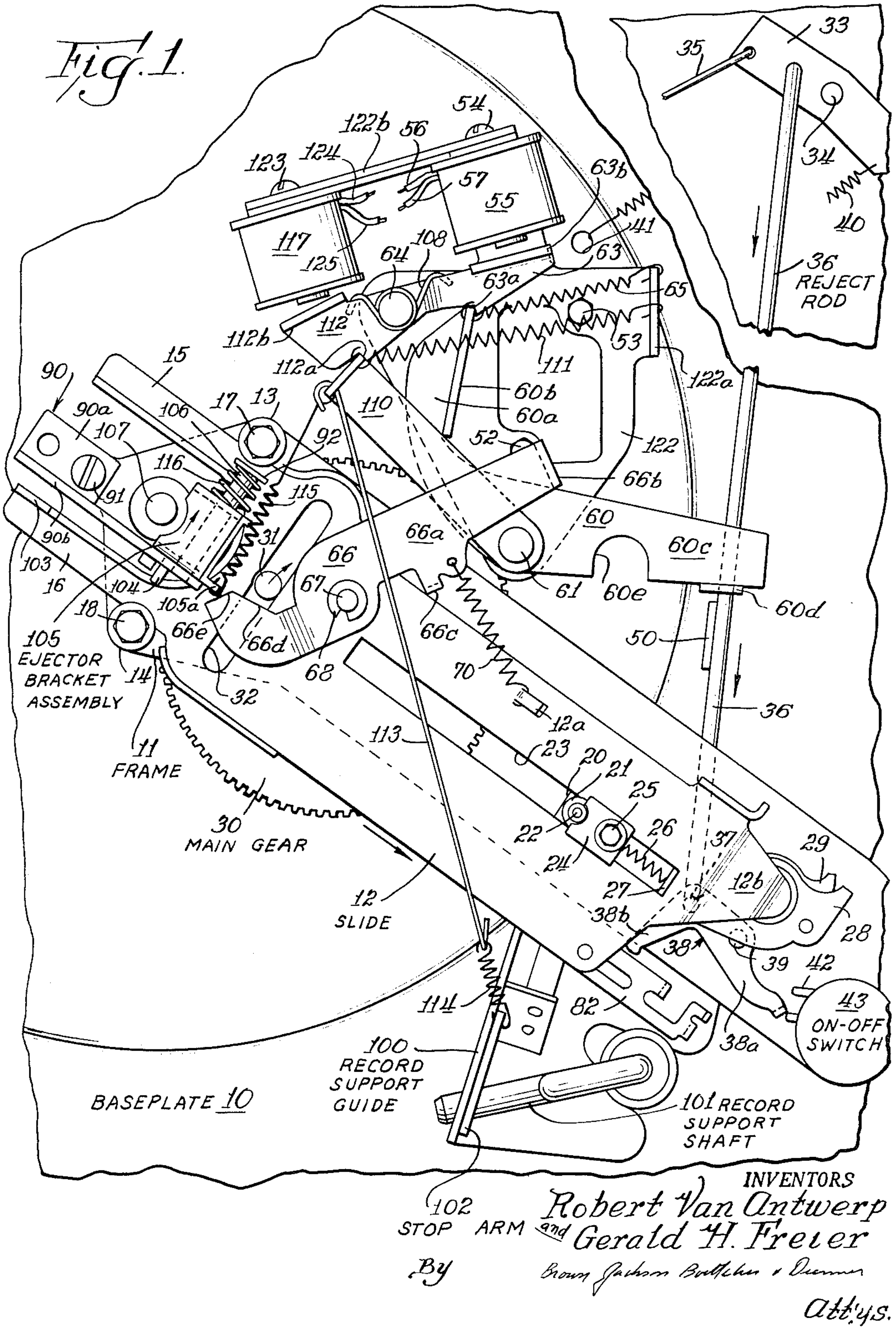
FIGURE 1 is a bottom view of a portion of an automatic record changer in which a preferred embodiment of the invention has been incorporated.

As shown in FIGURE 1, the record changer includes conventional elements such as baseplate 10 which serves as a support member for the other elements including a turntable pivotally mounted for rotation about its center, a spindle, a tone arm, and a record support arm, all conventionally positioned above the baseplate (and thus not visible in FIGURE 1) for actuation by the turntable drive assembly and the record changing mechanism which are basically disposed below the baseplate. The turntable drive assembly (not shown) conventionally includes a shaft extending upwardly through a suitably apertured portion of the baseplate with an idler wheel mounted on the shaft to engage and drive the turned-down rim of the turntable, thus to rotate the turntable and effect a corresponding rotation of the turntable hub. The lower portion of the turnable hub has an integral gear formed thereon, and as the turntable hub gear is rotated with the turntable, selective engagement of the toothed portion of a main gear 30 in the record changing mechanism with the turntable hub gear provides a driving connection over which power is supplied to the record changer mechanism during each change cycle.

A frame member 11 for supporting the operating elements of the record changer mechanism is affixed to baseplate 10 by suitable fastening means (not shown). The operating elements supported by such frame assembly include a slide member 12 having a tongue 12_b_ at one end thereof, a central guide slot 23, a transverse or cross drive slot 32 positioned substantially normal to guide slot 23, and a bifurcated end portion having forked extensions or arms 15 and 16 with a tab 103 formed at the end of extension 16. Frame 11 includes a pair of guide pillars 13 and 14 which extend downwardly from the baseplate (or toward the viewer as seen in FIGURE 1), and each of the guide pillars includes a cut-away shoulder section (not visible) for receiving projections 15 and 16 at the bifurcated end portion of slide 12. A pair of washer-head screws 17 and 18 are respectively threaded into correspondingly tapped portions in the guide pillars, and the heads of the screws extend over projections 15 and 16 to provide, in effect, guide channels for the bifurcated end portion of slide member 12.

The slide is further supported and guided near its opposite extremity by a supporting post 20, which comprises an upwardly extending guide cylinder 21 that terminates in a cylindrical projection 22. Guide cylinder 21 has an outer diameter only slightly less than the width of guide slot 23 in slide 12, to reference or guide the slide member in its longitudinal reciprocation during each change cycle. A cover plate 24 is fastened to post 20 by a screw 25, and this cover plate extends over the edges of slot 23. A bias spring 26 is positioned between cover plate 24 and an upwardly struck tab 27 at the end of slot 23, to urge pin 31 into its at-rest position at the end of each change cycle. Thus, with three main points of support and indexing as described, the slide member is positioned above frame 11 and referenced to permit longitudinal reciprocation along an axis generally coincident with the center of guide slot 23.

Another important operating element of the record changer mechanism is main gear 30 which drives slide member 12, the main gear being mounted between frame 11 and the slide. Gear 30 is pivoted about a shaft fixed in a pillar (not visible) of frame 11, and a pin 31, eccentrically mounted on gear 30, extends upwardly from such gear through transverse drive slot 32 in slide 12. Thus, rotation of main gear 30 and concomitant angular displacement of eccentric pin 31 is translated into rectilinear movement of slide 12 by reason of the engagement of pin 31 within transverse slot 32.

Teeth are located along the outer periphery of main gear 30 except for a short recessed portion (not visible) normally positioned adjacent the gear teeth on the turntable hub. Accordingly, as the turntable is driven in conventional fashion over the driving connection with the idler wheel, the smooth recessed section of main gear 30 is maintained adjacent the gear on the turntable hub, and the record changer mechanism is idle. It is only at the initiation of a change cycle, whether by a conventional velocity trip mechanism as the tone arm is accelerated toward the center of a record, by manual operation of the control knob, or by operation of the novel first auxiliary control means described herein, that the teeth on main gear 30 adjacent such recessed portion are kicked into engagement with the gear teeth on the turntable hub to drive main gear 30 through a complete revolution and thereby effect the reciprocation of the slide member to accomplish the various control operations in the record changing cycle.

Such control operations include the raising of the tone arm, rotation of the tone arm outwardly to clear the largest-diameter record that can be dropped to the turntable, displacement of the actuator of the spindle mechanism by movement of the push rod to drop the next record onto the turntable stack, return of the tone arm inwardly toward the proper position for set-down on the rim area of the next record to be played, and downward movement of the tone arm to effect such engagement of the needle on the rim portion of the record. Translation of the rectilinear movement of slide 12 into the various motions required to perform such functions are well known and understood in the art, and are explained for example in the above-identified Service Manual and Parts List, and such descriptions are also available in the conventional technical and servicing bulletins, such as the Photofact Folder Set 436, Folder 18. Accordingly the engagement of the slide member with such elements during the change cycle is not described herein, with the exception of the engagement of the tab on the slide with the ejector bracket assembly to displace the push rod and drop the lowermost record from the unplayed stack to the turntable stack.

As indicated above, the record changer unit may be selectively operated by rotating the control knob located on the upper side of baseplate 10 to different control positions. Such selector knob or manual control means is connected to one end of a shaft 34, which shaft extends through the baseplate and is connected to a control plate 33. Thus rotation of the control knob effects a simultaneous angular displacement of control plate 33 about shaft 34. A bias spring 40, conventionally designated the reject spring, has one end thereof connected to control plate 33 at the side opposite that to which reject rod 36 is connected, and the other end of bias spring 40 is connected to an aperture 41 in baseplate 10. Responsive to movement of the control knob from the "off" to the "reject" position, or from the "on" to the "reject" position and the subsequent release thereof, bias spring 40 returns control plate 33 to the "on" position.

Control plate 33 operatively controls a retraction rod 35 and reject rod 36. Retraction rod 35 has one end connected to control plate 33 and the opposite end coupled to the idler wheel assembly (not shown) of the turntable drive means to ensure that the idler wheel is withdrawn from contact with the turntable when the changer is shut off, thereby preventing flattening of the idler wheel when the changer is de-energized for a long interval. Reject rod 36 has one end bent to extend through control plate 33, and its opposite end bent at right angles to extend through an aperture 37 in control assembly 38. Because of their interconnection and cooperation, reject rod 36 and control assembly 38 will be considered a single actuator means for translating movement in the various control operations described herein and in the appended claims. Control assembly 38 comprises a power switch actuating arm 38*a* and a trip link actuating arm 38*b*, which assembly is pivotally supported by shaft 39 secured in frame assembly 11.

As the on-off-reject control knob is rotated from the "off" to the "on" position to effect a corresponding rotation of the control plate 33, reject rod 36 connected thereto is similarly displaced and in turn effects a corresponding movement of control assembly 38 about shaft 39. Accordingly, arm 38*a* is displaced to move yoke actuator 42 and turn on-off switch 43 to the "on" position. As the control knob is further rotated from the "on" to the "reject" position, control plate 33 is further rotated, thus displacing reject rod 36 and effecting an additional rotation of control assembly 38. This additional rotation of control assembly 38 moves arm 38*b* sufficiently to engage and displace the end of trip link or control means 82, thereby initiating a change cycle of the record changer mechanism. Subsequent change cycles can be initiated in the same manner by manual rotation of the control knob, by displacement of the trip finger cam as the needle enters the trip grooves near the center of the record, or by actuation of the first auxiliary control means as described hereinafter.

A support bracket 90 includes a mounting arm 90*a*, secured by screw 91 to frame 11, and a support arm 90*b* disposed at right angles to arm 90*a*. A support shaft 106 has one end affixed to and supported by arm 90*b*, and ejector bracket assembly 105 is mounted on shaft 106 for pivotal displacement thereabout to engage push rod 107 and displace same vertically, thus to effect the dropping of a record from the stack to the turntable. A bias spring 116 is positioned between assembly 105 and a stop member 92, the stop member being affixed to the end of shaft 106, to normally urge assembly 105 against arm 90*b* of support bracket 90 and prevent lateral displacement of the ejector bracket assembly. During a change cycle of a conventional record changer, slide member 12 is displaced along the linear path described heretofore and tab or sliding wedge 103 on the slide member is moved into engagement with lug 104 to cause ejector bracket assembly 105 to pivot and effect the dropping of a record from the stack to the turntable. Tab 105*a* on one end of ejector bracket assembly 105 is connected to control means in the novel remote control mechanism to effect lateral displacement of assembly 105 as will be described in more detail hereinafter.

STRUCTURE OF THE INVENTION

The conventional structure thus far described can provide only for manual control of the record changer on, off, and reject functions. In accordance with the present invention, structure is provided for selectively effecting energization of the record changer from a location remote from the changer itself, rejection of a record from the same remote point, and automatic shut-off of the record changer from such remote location, without the dropping of a record from the unplayed stack as the record changer mechanism is driven through a complete change cycle.

As shown in FIGURE 1 (and separately shown in FIGURE 2) the remote control mechanism includes a first and a second auxiliary control means supported and affixed to a mounting plate 122 which is in turn secured to the baseplate 10 by screws 52 and 53. Mounting plate 122 comprises a bent-up flange portion 122*a* for securing the ends of certain spring elements, as will be described hereinafter, and another bent-up flange portion 122*b*. A first mounting screw 54 extends through flange 122*b* to mount an electromagnet 55 with the core thereof disposed along a horizontal axis, and a second mounting screw 123 extends through the other end of flange portion 122*b* to secure a second electromagnet 117 with the axis of the core disposed in parallel, spaced relation to the core of electromagnet 55. Conductors 56, 57, 124 and 125 extend from the windings 55*a* and 117*a* for connection in a control circuit shown in FIGURE 5 and described in more detail hereinafter.

A first auxiliary control means comprises a first actuator lever 60 having an L-shaped configuration which is pivotally mounted near its central portion for rotational movement about a shaft 61, which is fastened to and supported by mounting plate 122, the lever being movable between a first or cocked position (illustrated in FIGURES 1 and 2) and a second or restored position. Lever 60 includes a cocking arm 60*a* having a flange portion 60*b*, thereon, a trip arm 60*c* having a flange or hammer 60*d* formed thereon for engagement with a stud 50 affixed to reject rod 36 as actuator lever 60 is rotated in the clockwise direction about shaft 61 from its cocked position to its restored position, and a generally semi-circular cut-out 60*e* in arm 60*c* to facilitate passage of the leads from the cartridge at the end of the tone arm, if desired. Bias spring 65 is connected between flange 122*a* of the mounting plate and the end of cocking arm 60*a* of the actuator lever, to urge first actuator lever 60 in the clockwise direction about pivot shaft 61. A first trip latch 63 is pivotally mounted on a stud 64 which is affixed to mounting plate 122. Trip latch 63 has a detent portion 63*a* and an upright flange or arm portion 63*b* disposed in facing relation with the core of electromagnet 55 for attraction thereby. A coil spring 108 urges trip latch 63 in the clockwise direction to cause the detent portion 63*a* to engage the cocking arm 60*a* of lever 60 whenever such lever is in the cocked or stored-energy position.

The second auxiliary control means mounted on common base or mounting plate 122 comprises a second actuator lever 110 of a rectangular shape which is mounted at one end for rotation about pin or stud 61 between a stored-energy or cocked position (shown in FIGURE 1) and a restored position. A side portion of second lever 110 is disposed in the path of movement of the flange portion 60*b* on first actuator lever 60 as it is moved to its cocked or stored-energy position, and an upturned flange portion at the opposite end of lever 110 is disposed for engagement by the shoulder portion of a second trip latch 112 to hold second actuator lever 110 in the stored-energy position when moved thereto. Bias spring 111 is connected between the upturned end of second actuator lever 110 and upturned flange 122*a* of mounting plate 122, the spring being under tension whenever the actuating lever 110 is in the cocked or stored-energy position.

A first control means, shown as a rod 113 and a spring 114, is connected between second actuator lever 110 and one end of stop arm 102, to effect a movement of stop arm 102 exactly similar to that produced by a downward displacement of record support shaft 101, such as occurs when the last record falls to the turntable stack. Actuator lever 110 is further connected over a second control means, illustrated as a combination rod and spring element 115, to a point on the ejector bracket assembly 105, so that movement of second actuator lever 110 in the clockwise direction effects a displacement of ejector bracket assembly 105 in the direction indicated by the arrow against the force of bias spring 116, thereby displacing the ejector bracket assembly including lug 104 out of the path of tab 103 on the slide member, to prevent actuation of the ejector bracket assembly and consequent upward displacement of push rod 107 to drop a record during the record changing cycle.

Trip latch 112 is pivotally mounted on stud 64 with latch 63, and coil spring 108 on stud 64 biases latch 112 in a counterclockwise direction to move the detent or shoulder portion 112*a* thereon into a latching position for actuator 110 whenever the second actuator lever is moved to its stored-energy position.

A cocking lever 66 for the two actuator levers 60, 110 is journalled about the upper portion of a shaft 67 which is affixed to and supported by slide member 12. A C-washer 68 secures lever 66 on shaft 67. Lever 66 includes a cocking arm 66*a* having a downwardly depending flange portion 66*b* for engaging flange 60*b* of first actuator lever 60, a stop lug 66*c* struck downwardly to engage the side of slide 12 and thus prevent rotation of the cocking lever in the clockwise direction under the urging of bias spring 70 beyond the extent shown, and an actuating arm including a sloping or angled portion 66*d* and an end surface 66*e* adjacent the sloping portion.

Sloping or angled portion 66*d* and end portion 66*e* are positioned for engagement by eccentric pin 31 as main gear 30 is displaced through a portion of a change cycle, thus to effect a counterclockwise rotation of cocking lever 66, portion 66*b* of lever 66 engaging flange portion 60*b* of lever 60 to displace first actuator lever 60 from the restored position into the cocked or stored-energy position (provided it is not already cocked) as shown in the drawing. During this movement of lever 60, flange 60*b* thereof engages the side of second actuator lever 110 and returns actuator lever 110 from the restored to the cocked position, if the second actuator lever is not already cocked.

Figures 3, 4, 5:
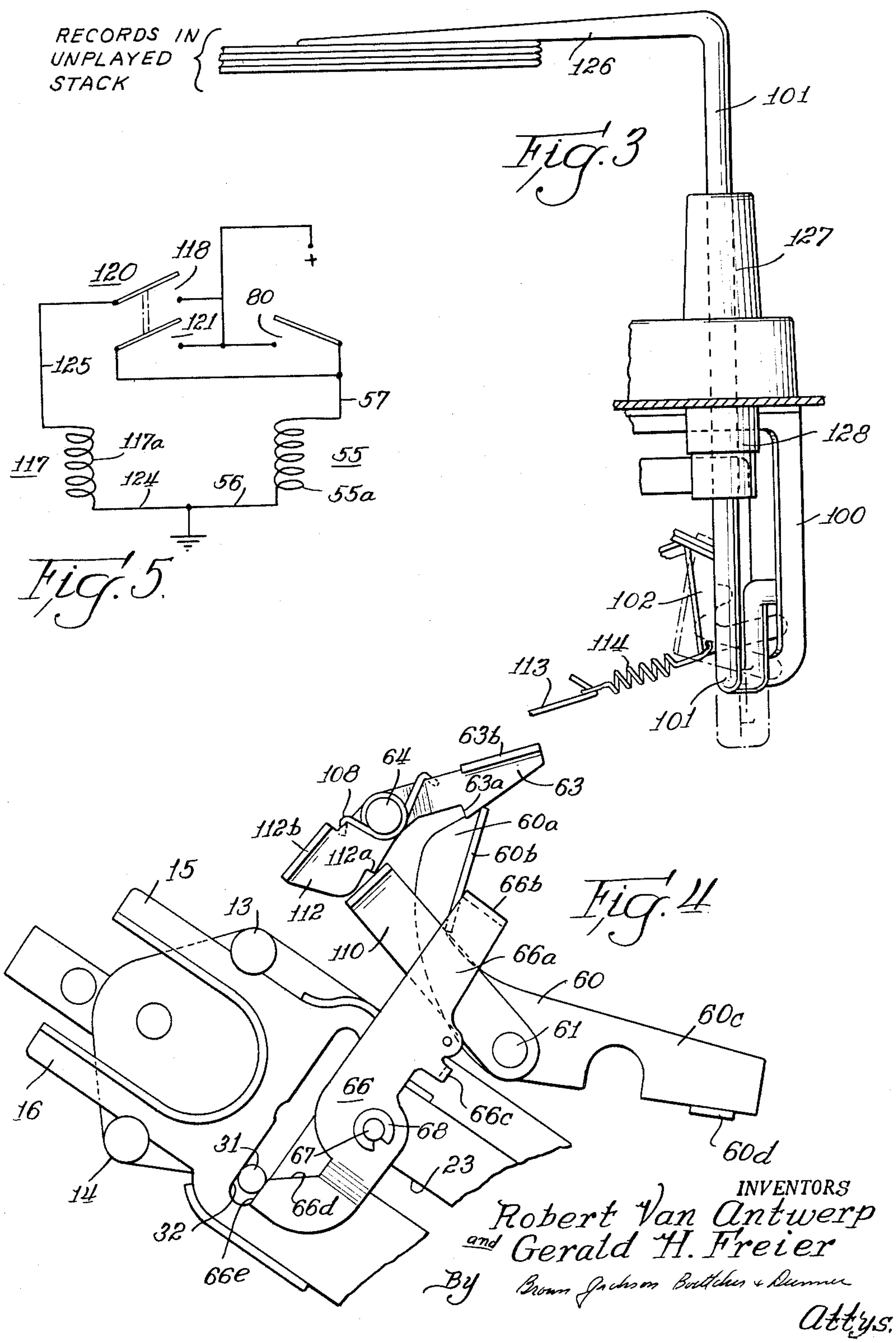
FIGURE 3 is a perspective view illustrating one aspect of the invention.
FIGURE 4 is an illustrative diagram useful in understanding operation of the invention.
FIGURE 5 is a schematic diagram of the control circuit of the invention.

The control system for selectively energizing the windings of electromagnets 55 and 117 is illustrated in FIGURE 5. As there shown, one end of winding 55*a* of electromagnet 55 is connected over conductor 56 to ground, and the opposite end of this winding is connected over conductor 57 both to the movable contact of switch 80 and to the movable contact of contact set 121 of the double pole switch 120. Winding 117*a* has one end thereof connected over conductor 124 to ground, and the other end connected over conductor 125 to the movable contact of contact set 118 of the double pole switch 120. The fixed contacts of switches 80 and 120 are connected to a common point, to which positive operating potential is applied.

Closure of switch 80 is effective to complete an obvious energizing circuit for electromagnet 55, thus energizing winding 55*a* to operate the first auxiliary control means of the invention. Alternatively, closure of the double pole switch 120 is effective to simultaneously energize both electromagnets 55 and 117, effecting a concomitant operation of both the first and second auxiliary control means of the invention. It is apparent that switch 120 may be located some distance remote from the record player, or alternatively may be located adjacent the record player and controlled from a remote point by remote control signalling devices now commercially available. Further, a switch such as 120 may also be located on the record player (with or without remote control means) for manual control by the user at a position adjacent the record changer.

With this initial perspective of the inventive apparatus and its interconnection with conventional elements of the record changer, operation of the invention and its cooperation with the record changer mechanism will now be described.

OPERATION OF THE INVENTION

Figure 2:
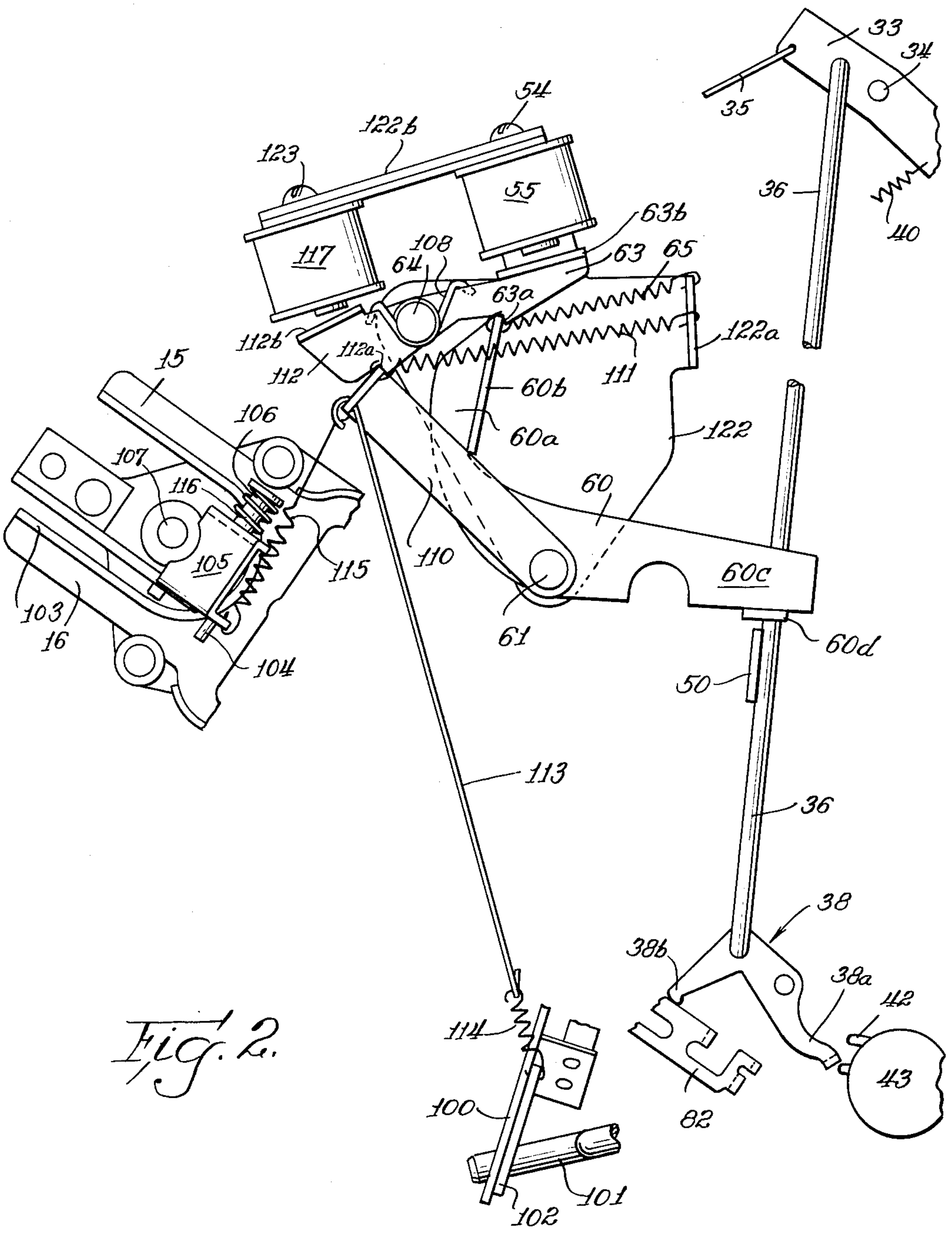
FIGURE 2 is a simplified operating diagram, partly in schematic form, depicting the cooperation between certain salient components of the inventive structure and conventional elements of a record changer mechanism.

It is initially assumed that both the first and second auxiliary control means are in the cocked position as indicated in FIGURES 1 and 2 of the drawings. It is further assumed that a control impulse is transmitted to the equipment, as for example by closing the double-pole switch 120 in FIGURE 5, to simultaneously energize windings 55*a* and 117*a* of the two electromagnets, or in effect transmit a "shut-off" command to the record changer apparatus. Operation of the novel remote control arrangement will be described in connection with FIGURE 1.

With simultaneous energization of both electromagnets trip latches 63 and 112 are pivoted in the counterclockwise and clockwise directions, respectively, thereby releasing first and second actuator levers 60 and 110. Each of the actuator levers is swiftly rotated in the clockwise direction under the urging of the respective bias springs 65 and 111. The flange 60*d* at the end of first actuator lever 60 engages stud 50 and displaces reject rod 36 to initiate a change cycle, as explained above. However, the control actions of the second auxiliary control means including the second actuator lever also occur at the same time, and thus are effectively completed before the change cycle actually is commenced.

That is, second actuator lever 110 rotates about shaft 61, to operate both control rod 113 and the rod-and-spring element 115. Movement of rod 113 tensions spring 114 and applies a force to stop arm 102 which, as better indicated in FIGURE 3, causes a rotation of the stop arm 102 exactly similar to that effected when record support shaft 101 is dropped by the force of gravity when the last record falls from the unplayed stack to the turntable stack. FIGURE 3 illustrates a record support arm 126 connected to record support shaft 101, which is supported in pillar 127 above the turntable. A corresponding cylindrical housing 128 below the turntable journals the record support shaft 101 therein. From the illustration of FIGURE 3 it is evident that as the last record in the unplayed stack is dropped to the turntable, horizontal arm 126 is displaced downwardly under the force of gravity, causing a downward displacement of the record support shaft 101 to engage and displace preparatory means or stop arm 102, which movement conditions the record changer mechanism for shut-off during the next subsequent change cycle as described hereinabove. It is thus apparent that the application of force over control rod 113 (FIGURE 2) and spring 114 to effect a corresponding movement of stop arm 102 also conditions the record changer mechanism for shut-off during the next change cycle, which cycle will be the one just initiated by displacement of reject rod 36. In this explanation stop arm 102 will be considered a preparatory means, operative as actuated when the record support arm falls downwardly to condition the record changer mechanism for shut-off during the next subsequent change cycle thereof.

The second control action effected by rotation of second actuator lever 110 is the displacement of ejector bracket assembly 105 from the position illustrated in FIGURE 2 to the non-operative position, in which the lug 104 is moved out of the path in which it is normally engaged by tab 103 on the forked extension 16 of slide member 12 during reciprocation of the slide. Engagement of tab 103 with lug 104 would normally occur after the slide has been displaced from its at-rest position and prior to the half-way point in the change cycle. However, responsive to rotation of second actuator lever 110 and the tensioning of rod-and-spring element 115, the ejector bracket assembly is displaced along shaft 106 as indicated by the arrow against the restraining force of bias spring 116, to ensure that there is no rotation of the ejector bracket assembly 105 and consequent displacement of push rod 107 to drop a record to the turntable. Accordingly rotation of second actuator lever 110 has accomplished two control functions, both ensuring that a record will not be dropped to the turntable during the next change cycle and further providing that the record changer itself will be shut off during the next change cycle. The "next change cycle" is the one which is commenced by the rotation of first actuator lever 60 and displacement of the reject rod 36, because the main gear 30 does not commence its rotation until both the control actions effected by rotation of lever 110 have already been accomplished. Thus, because the automatic shut-off mechanism is conditioned for operation and the record push-off is normally provided prior to the end of the first half of the change cycle, both the first and second actuator levers can be returned to the cocked position during the last half of the change cycle. Such operation has the obvious advantage of placing a minimum load on the turntable drive motor, because most of the record changer functions have already been accomplished by this time as now shown in more detail.

Referring to FIGURE 1, when a change cycle is initiated and the record changer mechanism commences operation, main gear 30 is driven through practically a full cycle of rotation. Eccentric pin 31, positioned on the main gear for rotation thereby is rotated in the direction indicated by the arrow, or in the clockwise direction. Accordingly it is evident that more than one-half of the change cycle will be completed before pin 31 engages sloping portion 66*d* of the actuating arm of cocking lever 66. The pin is displaced upwardly and to the right as shown in FIGURE 1 during the first 90 degrees of rotation of main gear 30, and returns to the illustrated position at the end of the first half-cycle of rotation, when slide 12 has been displaced to its extreme of linear displacement. Then pin 31 commences moving downward to the left in channel 32, and engages sloping portion 66*d* of cocking lever 66 and commences to rotate the cocking lever in the counterclockwise direction about shaft 67, against the urging of bias spring 70. Such rotation continues as pin 31 rides up the sloping portion 66*d*, until the pin 31 abuts the end portion 66*e* of the cocking lever, at which time the cocking lever has been rotated through about 30 degrees and is substantially perpendicular to the slide. With continued return of the slide member the end flange 66*b* of the cocking lever engages the upturned flange 60*b* of first actuator lever 60, commencing the counterclockwise rotation of first actuator lever 60 and returning same to the cocked position. One end of flange 60*b* then engages the side of second actuator lever 110, as indicated in FIGURE 4 of the drawings, commencing a like return of the second actuator lever from the restored to the cocked position. Continued return of the slide under the urging of main gear 30 and pin 31 effects a continued displacement of the two actuator levers until they are returned to the position indicated in FIGURE 2, with bias spring 108 urging trip latches 63 and 112 into latching position, at which point the shoulder portions of the trip latches engage and secure the first and second actuator levers in the cocked position. Slide 12 then completes its return, with pin 31 returning to the center position shown in FIGURE 1 after riding down the ramp 66*d* to permit return of the cocking lever 66 to the at-rest position indicated in FIGURE 1 under the urging of bias spring 70. Stop latch 66*c* prevents return of the cocking lever beyond the extent indicated.

Referring to FIGURE 5, it is evident that winding 55*a* of electromagnet 55 can be separately energized by closing control switch 80. This action effects displacement of trip latch 63 (FIGURE 1) to release only the first actuator lever 60 and effect the movement of reject rod 36, either to energize the record changer equipment or to reject a record then playing. Closure of the other switch 120 effects simultaneous energization of both electromagnets 55 and 117, thus to condition the appropriate portions of the record changer mechanism to effect shut-off and prevent the dropping of a record during the change cycle in which shut-off is effected. The record changer has been provided with selective control of a plurality of functions from a location remote from the unit itself. The record changer can be energized initially by closing switch 80, any subsequent record can be rejected by closing switch 80, and the record changer mechanism can be shut off from the remote location by closing switch 120. It is evident that the second auxiliary control means has utility even without the first auxiliary control unit including actuator lever 60, in that a control impulse energizing only electromagnet 117 could be used to condition the record changer mechanism for shut-off when the record then playing was finished and the change cycle is initiated in conventional fashion. All of the remote control functions thus provided increase the versatility of the system, and it is still possible to control the record changer unit from the manual on-off-reject selector knob positioned above the baseplate and accessible to the listener.

SUMMARY

It is apparent from the foregoing description that the novel structure of the invention is capable of operating reliably and positively whether actuated by the remote control means, or by the conventional manual selector knob provided on the unit. In brief summary, assuming initially that the manual selector knob is in the "off" position, both of the first and second actuator levers 60 and 110 are retained in their cocked positions by the respective trip latches 63 and 112, such positioning having been accomplished during the last cycle of the record changer mechanism when shutting off. It is important to note that movement of the novel first and second auxiliary control means is such that manual rotation of the selector knob to the "off" position can never "jam" the remote control means, and any operation of the remote control means, whether before, during or after a manual operation of the control knob can also be effected without damaging the unit.

Assuming that the record player is to be operated by the remote control means, a command impulse is transmitted from a remote location as for example by closing switch 80, to release the energy stored in bias spring 65 and displace first actuator lever 60 to initiate a change cycle of the equipment. The second actuator lever 110 is not displaced, and as the record changer is energized and driven through the first change cycle, first actuator lever 60 is automatically re-cocked as energy is again stored in spring 65 to provide for a successive operation.

Alternatively, the record player can be initially started by manual displacement of the control knob from the "off" position through the "on" position to the "reject" position to initiate a change cycle. Since the control knob was in the "off" position prior to the initial actuation thereof, the auxiliary control means including both the first and second actuator levers must have previously been cocked as noted above, and such means remain in the cocked or stored-energy position through the change cycle. Such movement of the manual control knob can be accomplished without fear of damage to the mechanism, regardless of the position of the auxiliary ocntrol mechanism at such time.

During normal operation of the record changer, the records will be successively played and a change cycle will be initiated by the conventional velocity trip mechanism as the tone arm is accelerated in the high speed grooves toward the record center, and this operation does not affect either the position of the on-off-reject control knob or the auxiliary control means, which retains the energy stored therein for a subsequent operation. Any record can be rejected by manual rotation of the control knob from the "on" to the "reject" position, thus initiating a change cycle. If the change cycle is initiated by such acuation of the manual control knob, the linkage is such that the manual knob may be freely moved without damage to the first and second auxiliary control means, each of which remains cocked during the cycle. Alternatively, by operation of switch 80 at the remote location to release the energy stored in spring 65 and initiate a change cycle, the auxiliary control means displaces the reject rod and the control knob to the "reject" position to cycle the changer mechanism, without disturbing the second auxiliary control means including lever 110, and the changer mechanism in effecting a change cycle automatically re-cocks the first actuator lever 60 during the last half of the record change cycle. Such operation of the various control devices can be effected without danger of jamming or damaging any elements of the record changer unit.

When the last record is dropped from the unplayed stack to the turntable stack, the support arm falls and displaces the record support shaft to initiate the sequence of operations which, during the next cycle of the record changer mechanism, shuts off the changer with the auxiliary control means still in the coked position. The record changer may also be deenergized manually, by moving the control knob from the "on" to the "off" position, the linkage being such as to permit the movement of the control knob without operation of the auxiliary control means which remains cocked.

If it is desired to de-energize the equipment prior to the dropping of the last record from the unplayed stack, the second auxiliary control means is utilized. That is, control switch 120 is closed to simultaneously energize each of electro-magnets 55 and 117. Accordingly both actuator levers 60 and 110 are rotated, lever 110 conditioning the record changer mechanism for shut-off during the next change cycle and displacing ejector bracket assembly 105 to avoid the dropping of the next record from the unplayed stack. The change cycle initiated by the simultaneous movement of the first actuator lever 60 is thus accomplished, shutting off the record changer and leaving all of the unplayed records in the stack above the turntable. Thus all of the various control functions can be accomplished either by signals transmitted from a remote location or by manual operation of the selector knob on the record changer itself, without any fear of damage to the equipment.

The invention provides a simple, positive arrangement for starting the record changer, rejecting a record, or shutting the record changer unit off from a location remote from that of the record changer apparatus. The listener is accordingly permitted to enjoy the reproduced intelligence without the necessity of a trip to the record changer each time it is desired to accomplish one or another control function. Energy for accomplishing the various functions is automatically stored as the mechanism which effects the record changing cycle is driven through the last half or the down-hill portion of a change cycle. In this part of the change cycle there is a minimum demand on the turntable drive motor and cycling equipment for other operations, and thus the energy can be stored in a pair of bias springs for subsequent use during the various control operations. The inventive mechanism is simple and economical to fabricate, and is positively operated responsive to a simple command such as actuation of a single electromagnet or a pair of electromagnets.

The electromagnet or electrically responsive device can be operated in any of a number of conventional ways. As illustrated, a control switch can be positioned at the listening location, and connected over an extension cord to the electromagnet. Alternatively, a system for propagating a signal at a frequency above the range of human audibility can be used; such a signal can be easily transmitted from a remote location, detected at the changer to provide a control impulse, and such control impulse then applied to the electromagnet.

Although only a particular embodiment of the invention has been shown and described, it is apparent that modifications and alterations may be made therein, and it is intended in the appended claims to cover all such modifications and alterations as may fall within the true spirit and scope of the invention.

What is claimed is:

1. In an automatic record changer of the type having record ejector means, automatic shut-off means, and remote control means and associated apparatus for performing the functions of initiating a record change cycle, conditioning the record changer for shut-off during such record change cycle, and disabling the record ejector means during such record change cycle, the improvement comprising, in combination, a first actuator lever movable from a cocked position to a released position to initiate a record change cycle, a second actuator lever movable from a cocked position to a released position to condition the record changer for shut-off during such record change cycle and to disable said record ejector means during such record change cycle, one of said actuator levers when in its released position being disposed in the path of the other of said actuator levers so as to be engaged thereby and moved to its cocked position when said other actuator lever is moved to its cocked position, and cocking means engageable with said other actuator lever for moving the latter to its cocked position during said record change cycle thereby to effect the cocking of both said first and second actuator levers.

2. In an automatic record changer of the type having record ejector means, automatic shut-off means, and remote control means and associated apparatus for performing the functions of initiating a record change cycle, conditioning the record changer for shut-off during such record change cycle, and disabling the record ejector means during such record change cycle, the improvement comprising, in combination, a first actuator lever movable from a cocked position to a released position to initiate a record change cycle, a second actuator lever movable from a cocked position to a released position to condition the record changer for shut-off during such record change cycle and to disable said record ejector means during such record change cycle, said second actuator lever when in its released position being disposed in the path of said first actuator lever so as to be engaged thereby and moved to its cocked position when said first actuator lever is moved to its cocked position, and cocking means engageable with said first actuator lever for moving the latter to its cocked position during said record change cycle thereby to effect the cocking of both said first and second actuator levers.

3. In an automatic record changer of the type having record ejector means, automatic shut-off means, and remote control means and associated apparatus for performing the functions of initiating a record change cycle, conditioning the record changer for shut-off during such record change cycle, and disabling the record ejector means during such record change cycle, the improvement comprising, in combination, a first pivotally mounted actuator lever rotatable from a cocked position to a released position to initiate a record change cycle, a second pivotally mounted actuator lever rotatable from a cocked position to a released position to condition the record changer for shut-off during such record change cycle and to disable said record ejector means during such record change cycle, one of said actuator levers when in its released pivotal position being disposed in the path of the other of said actuator levers so as to be engaged thereby and rotated to its cocked position when said other actuator lever is rotated to its cocked position, and cocking means engageable with said other actuator lever for rotating the latter to its cocked position during said record change cycle thereby to effect the cocking of both said first and second actuator levers.

4. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, an actuator lever movable from a cocked position to a released position to condition the record changer for shut-off and to disable said record ejector means, and a tension link member having one end connected to said actuator lever and its other end connected to said ejector means, said tension link being positioned for pulling said ejector means to its inoperative position when said actuator lever is moved to its released position.

5. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, an actuator lever movable from a cocked position to a released position to condition the record changer for shut-off and to disable said record ejector means, and a tension link member comprising a tension spring, said tension link member having one end connected to said actuator lever and its other end connected to said ejector means, and said tension link being positioned for pulling said ejector means to its inoperative position when said actuator lever is moved to its released position.

6. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, a pivotally mounted actuator lever rotatable from a cocked position to a released position to condition the record changer for shut-off and to disable said record ejector means, and a tension link member having one end connected to said pivotally mounted actuator lever and its other end connected to said ejector means, said tension link being positioned for pulling said ejector means to its inoperative position when said actuator lever is rotated to its released position.

7. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, an actuator lever movable from a cocked position to a released position to condition the record changer for shut-off and to disable said record ejector means, a first tension link member having one end connected to said actuator lever and its other end connected to said ejector means, said first tension link being positioned for pulling said ejector means to its inoperative position when said actuator lever is moved to its released position, and a second tension link member having one end connected to said actuator lever and its other end connected to said shut-off means, said second tension link member being positioned for pulling said shut-off means to an operative position to condition the record changer for shut-off when said actuator lever is moved to its released position.

8. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, a pivotally mounted actuator lever rotatable from a cocked position to a released position to condition the record changer for shut-off and to disable said record ejector means, a first tension link member having one end connected to said pivotally mounted actuator lever and its other end connected to said ejector means, said first tension link being positioned for pulling said ejector means to its inoperative position when said actuator lever is rotated to its released position, and a second tension link member having one end connected to said pivotally mounted actuator lever and its other end connected to said shut-off means, said second tension link member being positioned for pulling said shut-off means to an operative position to condition the record changer for shut-off when said actuator lever is rotated to its released position.

9. The invention of claim 8 wherein said first tension link member comprises a tension spring.

10. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, a first pivotally mounted actuator lever rotatable from a cocked position to a released position to initiate a record change cycle, a second pivotally mounted actuator lever rotatable from a cocked position to a released position to condition the record changer for shut-off and to disable said record ejector means during such record change cycle, a tension link member having one end connected to said second pivotally mounted actuator lever and its other end connected to said ejector means, said tension link being positioned for pulling said ejector means to its inoperative position when said second actuator lever is rotated to its released position, one of said actuator levers when in its released pivotal position being disposed in the path of the other of said actuator levers so as to be engaged thereby and rotated to its cocked position when said other actuator lever is rotated to its cocked position, and cocking means engageable with said other actuator lever for rotating the latter to its cocked position during said record change cycle thereby to effect the cocking of both said first and second actuator levers.

11. In an automatic record changer of the type having record ejector means which is movable between an operative position wherein it is capable of effecting the dropping of a record to be played and an inoperative position wherein it is incapable of effecting the dropping of a record, automatic shut-off means, and remote control means and associated apparatus for performing the functions of initiating a record change cycle, conditioning the record changer for shut-off during such record change cycle, and moving said ejector means to its inoperative position during such record change cycle, the improvement comprising, in combination, a first pivotally mounted actuator lever rotatable from a cocked position to a released position to initiate a record change cycle, a second pivotally mounted actuator lever rotatable from a cocked position to a released position to condition the record changer for shut-off and to disable said record ejector means during such record change cycle, a first tension link member having one end connected to said second pivotally mounted actuator lever and its other end connected to said ejector means, said first tension link being positioned for pulling said ejector means to its inoperative position when said second actuator lever is rotated to its released position, a second tension link member having one end connected to said second pivotally mounted actuator lever and its other end connected to said shut-off means, said second tension link member being positioned for pulling said shut-off means to an operative position to condition the record changer for shut-off when said second actuator lever is rotated to its released position, one of said actuator levers when in its released pivotal position being disposed in the path of the other of said actuator levers so as to be engaged thereby and rotated to its cocked position when said other actuator lever is rotated to its cocked position, and cocking means engageable with said other actuator lever for rotating the latter to its cocked position during said record change cycle thereby to effect the cocking of both said first and second actuator levers.

References Cited by the Examiner

UNITED STATES PATENTS

| | | | |
|---|---|---|---|
| 2,378,086 | 6/1945 | Johnson | 274—10 |
| 2,595,125 | 4/1952 | Carson | 274—10 |
| 2,868,545 | 1/1959 | Vistain | 274—10 |
| 2,888,267 | 5/1959 | Murro | 274—10 |

NORTON ANSHER, *Primary Examiner.*

NEWTON N. LOVEWELL, ARNOLD RUEGG, EVON C. BLUNK, *Examiners.*